US009677660B2

(12) United States Patent
Schwendemann et al.

(10) Patent No.: US 9,677,660 B2
(45) Date of Patent: Jun. 13, 2017

(54) GEAR MECHANISM COMPONENT HAVING A HOLDER FOR MOUNTING A COMPONENT

(71) Applicant: Robert Bosch GmbH, Stuttgart (DE)

(72) Inventors: Franz Schwendemann, Ottersweier (DE); Hans-Juergen Oberle, Rastatt (DE)

(73) Assignee: Robert Bosch GmbH, Stuttgart (DE)

( * ) Notice: Subject to any disclaimer, the term of this patent is extended or adjusted under 35 U.S.C. 154(b) by 37 days.

(21) Appl. No.: 14/692,855

(22) Filed: Apr. 22, 2015

(65) Prior Publication Data

US 2015/0316140 A1 Nov. 5, 2015

(30) Foreign Application Priority Data

Apr. 30, 2014 (DE) ........................ 10 2014 208 227

(51) Int. Cl.
*F16H 57/04* (2010.01)
*F16N 7/12* (2006.01)
*F16N 9/02* (2006.01)

(52) U.S. Cl.
CPC ..... *F16H 57/0406* (2013.01); *F16H 57/0471* (2013.01); *F16H 57/0479* (2013.01); *F16N 7/12* (2013.01); *F16N 9/02* (2013.01); *Y10T 29/49703* (2015.01)

(58) Field of Classification Search
CPC ............ F16H 57/0406; F16H 57/0472; F16H 57/0479; F16H 57/048; F16H 57/0423; F16H 57/043; F16H 57/045; F16H 57/0483; F16H 57/042; F16N 7/12; F16N 9/02; Y10T 29/49702
See application file for complete search history.

(56) References Cited

U.S. PATENT DOCUMENTS

| 1,274,433 | A | | 8/1918 | Mix |
| 1,940,110 | A | | 12/1933 | Watts et al. |
| 2,135,477 | A | | 11/1938 | Griswold |
| 2,456,591 | A | | 12/1948 | Parry |
| 2,708,985 | A | * | 5/1955 | Evans ...................... F16N 7/32 184/11.1 |
| 3,033,312 | A | | 5/1962 | Enders |
| 3,332,303 | A | * | 7/1967 | Daugherty ............ F16K 31/045 192/138 |
| 2002/0049109 | A1 | * | 4/2002 | Ohmi .................... F02N 15/046 475/159 |
| 2003/0122435 | A1 | | 7/2003 | Yamamura et al. |

(Continued)

FOREIGN PATENT DOCUMENTS

| DE | 102010038597 A1 * | 2/2012 | ........... F16H 57/082 |
| JP | 6131763 | 2/1986 | |

(Continued)

*Primary Examiner* — Derek D Knight
*Assistant Examiner* — Lori Wu
(74) *Attorney, Agent, or Firm* — Michael Best & Friedrich LLP

(57) ABSTRACT

A gear mechanism component having a holder for mounting a component, a lubricant carrier which is infused with a lubricant being pressed into the holder, a gear mechanism arrangement having the gear mechanism component and the component, an adjusting drive having the gear mechanism arrangement, and a method for assembling the gear mechanism arrangement.

16 Claims, 2 Drawing Sheets

(56) References Cited

U.S. PATENT DOCUMENTS

| | | | | |
|---|---|---|---|---|
| 2009/0110339 A1* | 4/2009 | Hibi | ...................... | F16C 17/02 384/322 |
| 2011/0142387 A1* | 6/2011 | Sato | .................... | F16C 17/107 384/397 |
| 2013/0029801 A1* | 1/2013 | Oberle | ................. | F16H 37/041 475/343 |

FOREIGN PATENT DOCUMENTS

| | | | |
|---|---|---|---|
| JP | 63164321 | * 10/1988 | ............ F16C 33/10 |
| JP | 09280322 | 10/1997 | |
| JP | 10196750 | 7/1998 | |
| JP | 2002031138 | 1/2002 | |

* cited by examiner

GEAR MECHANISM COMPONENT HAVING A HOLDER FOR MOUNTING A COMPONENT

BACKGROUND OF THE INVENTION

The present invention relates to a gear mechanism component having a holder which serves as a bearing point for a bearing journal of a component, to a gear mechanism arrangement having the gear mechanism component and the component, to an adjusting drive for a motor vehicle, in particular a tailgate drive, having the gear mechanism arrangement, and to a method for assembling the gear mechanism arrangement.

Adjusting drives which have a high step-down transmission ratio and transmit a high torque are frequently required to adjust components, for example a tailgate of a vehicle, a sliding roof or, in particular, to adjust the height or tilt of a seat. Planetary gear mechanisms are frequently used for this purpose, a plurality of gear mechanism stages often being arranged one after another.

In the case of bearing points which are arranged in a component which is manufactured from sintered steel, oil is frequently embedded into the pores of the sintered steel in order to lubricate the bearing point. The bearing point is oil-impregnated as a result. The oil can be discharged to a bearing journal which is mounted in the bearing point.

FIG. 1 shows a section through a planetary gear mechanism of an adjusting drive for motor vehicles. The planetary gear mechanism 10 has a housing 1, in which a planetary carrier 2 is mounted. A plurality of planetary gears 3 are arranged on the planetary carrier 2. Here, the housing 1 is covered on the drive side by way of a cover plate 4. A holder 2.1 which serves as a bearing point 50 is arranged in the planetary carrier 2. An assembly 5 is mounted on the operator's side in the holder 2.1 by means of a bearing journal 5.1. The planetary carrier 2 is produced from sintered steel, and the oil which is embedded in the sintered planetary carrier 2 is utilized to lubricate the bearing journal 5.1 during operation of the adjusting drive.

SUMMARY OF THE INVENTION

It is an object of the present invention to improve the lubrication of a bearing point of this type, in order, as a result, to reduce the wear at the bearing point, to increase the service life of the bearing point, and to reduce or even avoid the noise which is produced at the bearing point.

The object is achieved by way of a gear mechanism component, a gear mechanism arrangement, an adjusting drive, and a method for assembling a gear mechanism arrangement according to the invention.

For this purpose, a gear mechanism component is produced which has a holder which serves as a bearing point for mounting a component. The gear mechanism component is distinguished by the fact that a lubricant carrier which is infused with a lubricant is pressed into the holder. The lubricant which is stored in the lubricant carrier serves to lubricate the bearing point.

The lubricant carrier is preferably produced from a material with a large number of pores and long-term resistance. In this embodiment, the lubricant is arranged in the pores of the lubricant carrier. The lubricant carrier preferably discharges the lubricant to the bearing point, in particular under pressure loading. In one preferred embodiment, the lubricant carrier is a felt or sponge. The felt or sponge is preferably produced from a plastic. In principle, however, a felt or sponge made from a natural fiber can also be used.

The lubricant is preferably an, in particular synthetic, oil. Furthermore, graphite is preferably added to the oil. However, one embodiment of a lubricant carrier is also preferred which is produced from a material which contains graphite. Furthermore, the lubricant is preferably identical to or at least compatible with a lubricant which is embedded in the pores of the planetary carrier.

The gear mechanism component is preferably produced from a sintered steel. Furthermore, it is preferably oil-impregnated. In comparison with a bearing point which is lubricated only by way of the lubricant which is stored in the pores of the sintered, conventional gear mechanism component, the bearing point of the gear mechanism component of this embodiment is additionally lubricated by way of the lubricant which is stored in the lubricant carrier. More lubricant is therefore available for this bearing point, with the result that the bearing point is lubricated in an improved manner. However, one embodiment is likewise preferred, in which the gear mechanism component is not sintered or produced from sintered steel, and the lubrication takes place completely via the lubricant which is stored in the lubricant carrier.

The gear mechanism component has a side which faces the component. In one preferred embodiment, in particular in a delivery state of the gear mechanism component or in a delivery state of a gear mechanism arrangement having the gear mechanism component, the lubricant carrier is arranged in the holder on the side which faces the component. The lubricant carrier is preferably arranged in the holder in such a way that the component comes into contact with the lubricant carrier when pushed into the holder. In one particularly preferred embodiment, in the delivery state, the lubricant carrier is arranged in the holder flush with the side which faces the component. As a result, when the component is pushed into the holder, the lubricant carrier is displaced with said component. In the process, it discharges lubricant to the holder, with the result that the bearing point is lubricated.

Since the lubricant carrier is pressed into the holder, it is also under pressure after the component is pushed in, with the result that it continues to discharge lubricant to the bearing point.

In one preferred embodiment, the gear mechanism component is a planetary carrier. However, the invention is not restricted to planetary carriers, but rather can be used generally for gear mechanism components which have a holder which serves as a bearing point for mounting a component.

In addition, it is preferred that the holder is an, in particular circular, bore. However, holders with a different cross section are also suitable.

Furthermore, the object is achieved by way of a gear mechanism arrangement which comprises a gear mechanism component of this type, and a component which is provided for mounting in the holder.

The component preferably has a bearing journal which can be pushed into the holder in an axial direction.

It is preferred that, in the delivery state of the gear mechanism arrangement, the lubricant carrier is arranged on that side of the gear mechanism component which faces the component in such a way that the component, in particular the bearing journal, comes into contact with the lubricant carrier when pushed into the holder. As a result, the lubricant carrier is displaced with the component. In the process, the lubricant carrier discharges lubricant to the holder, which lubricant serves to lubricate the bearing point.

Furthermore, the component, in particular the bearing journal, is preferably mounted in the holder in an assembly state of the gear mechanism arrangement, the component bearing against the lubricant carrier. The lubricant carrier of this gear mechanism arrangement is preferably arranged behind the bearing journal in an axial direction. Since the lubricant carrier is pressed into the holder, it is also under pressure after the component is pushed in, with the result that it also continues to discharge lubricant to the bearing point.

It is preferred that the component is mounted rotatably in the holder. Or the holder is likewise preferably mounted rotatably on the component. On account of the satisfactory lubrication of the bearing point, the friction, the abrasion which is caused as a result and the development of noise during driving of the gear mechanism component are low.

Furthermore, the object is achieved by way of an adjusting drive for a motor vehicle, which adjusting drive comprises a gear mechanism arrangement of this type. In one preferred embodiment, the gear mechanism arrangement comprises a planetary gear mechanism. It is preferred in this embodiment that the gear mechanism component is a planetary carrier of the planetary gear mechanism. Furthermore, it is preferred in this embodiment that the component is an assembly, in particular a hinge of a component to be adjusted. In one particularly preferred embodiment, the adjusting drive is a tailgate drive and the component is a tailgate of a motor vehicle.

Furthermore, the object is achieved by way of a method for assembling a gear mechanism arrangement of this type, having the following steps: pressing the lubricant carrier into the holder in or counter to the axial direction, with the result that the said lubricant carrier is arranged on that side of the gear mechanism component which faces the component, and pushing the component into the holder in the axial direction, the component displacing the lubricant carrier in the axial direction.

The lubricant carrier discharges the stored lubricant to the bearing point when the component is pushed in, with the result that the said bearing point is lubricated. Since the lubricant carrier is pressed into the holder, it is still under pressure even after the displacement with the component, with the result that it also continues to discharge lubricant to the bearing point. As a result, the bearing point is lubricated in the long-term by way of the lubricant which is stored in the lubricant carrier.

At its bearing point, the gear mechanism component has lubrication which is improved overall and by way of which the wear of the bearing point is reduced, the service life of the bearing point is increased, and the noise which is produced at the bearing point is reduced or even avoided.

BRIEF DESCRIPTION OF THE DRAWINGS

The invention will be described in the following text using figures. The figures are merely by way of example and do not restrict the general concepts of the invention. In the figures.

DETAILED DESCRIPTION

Figure 1:
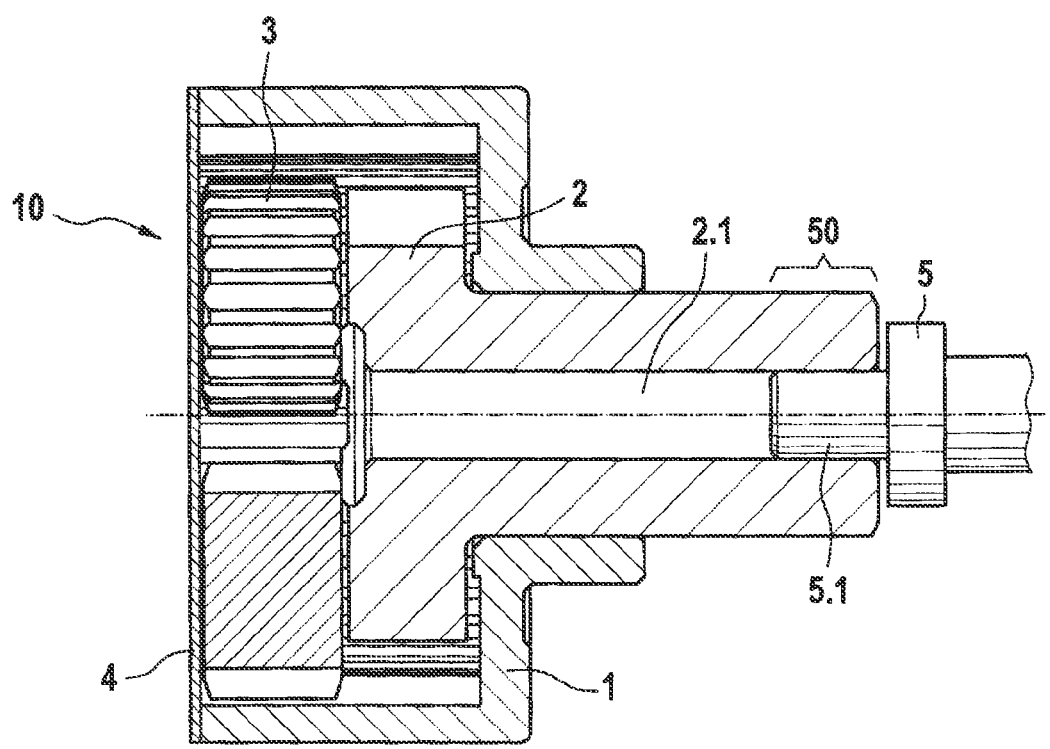
FIG. 1 shows a gear mechanism arrangement according to the prior art in a sectional illustration.

The gear mechanism arrangement 10 of FIG. 1 according to the prior art has already been described above.

Figure 2:
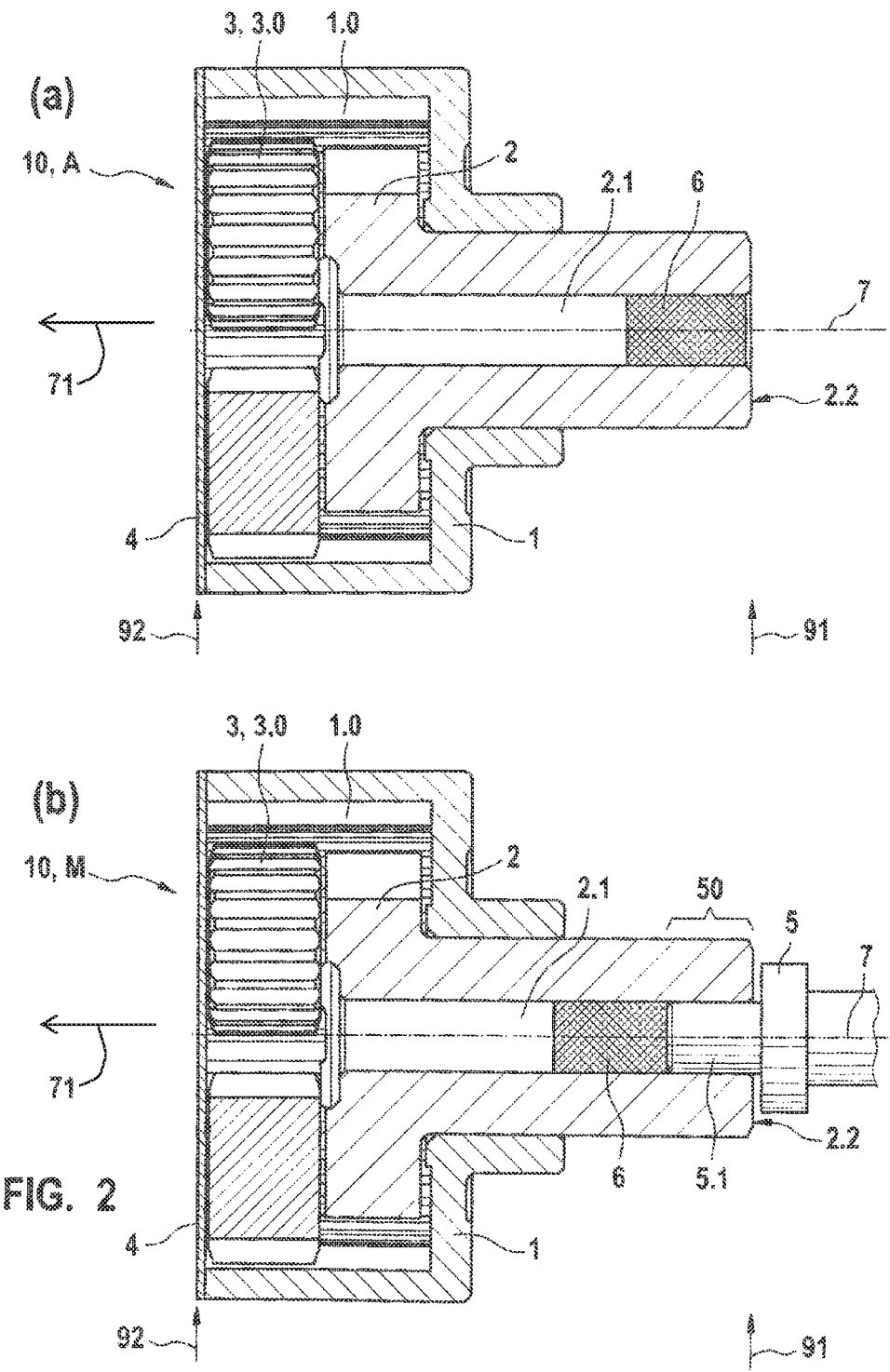
FIG. 2 shows sectional illustrations (a) and (b) of the gear mechanism arrangement according to the invention in a delivery state and an assembly state.

FIG. 2 shows a gear mechanism arrangement 10 according to the invention. The gear mechanism arrangement 10 comprises a gear mechanism component 2 which has a holder 2.1 which serves as a bearing point 50 for mounting a component 5. Here, the holder 2.1 is configured as a bore which is arranged concentrically about a rotational axis 7 of the gear mechanism arrangement 10. The bore has a circular cross section. It penetrates the gear mechanism component 2 completely in the axial direction 71. However, the invention is also suitable for different holders 2.1 which have a different cross section, for example a rectangular cross section, which are not configured concentrically with respect to an axis, and/or which do not penetrate the gear mechanism component 2 completely.

In the exemplary embodiment which is shown, the gear mechanism component 2 is a planetary carrier of a planetary gear mechanism. The gear mechanism arrangement 2 therefore comprises at least the gear mechanism stage which is configured as a planetary gear mechanism. Further gear mechanism stages are not shown here. In the context of FIG. 2, the expressions planetary carrier and gear mechanism component 2 are therefore used synonymously.

However, the invention also comprises gear mechanism arrangements having further or different gear mechanism stages, for example spur gear, bevel gear or worm gear mechanism stages. Instead of the planetary carrier, different gear mechanism components (not shown) of the gear mechanism stages (not shown) of different configuration may therefore also be suitable, which have a holder 2.1 as a bearing point 50 for mounting a component 5.

In addition, the gear mechanism arrangement 10 which is shown is a constituent part of an adjusting drive (not shown) which is provided for adjusting a component (not shown) for a motor vehicle. The component is preferably a tailgate and the adjusting drive is therefore a tailgate drive.

However, the invention is also suitable for different adjusting drives, for example for adjusting a seat, window, sliding roof or another hatch.

The gear mechanism arrangement 10 has a housing 1 which serves as an internal gear of the planetary gear mechanism. The housing 1 extends concentrically about the rotational axis 7. It has an internal toothing system 1.0. In the context of FIG. 2, the expressions internal gear and housing 1 are therefore used synonymously.

The planetary carrier 2 is mounted rotatably in the internal gear 1. It extends concentrically about the rotational axis 7. Planetary gears 3 are mounted rotatably on the planetary carrier 2. Each of the planetary gears 3 is mounted rotatably about a planetary axis (not shown) which is provided eccentrically with respect to the rotational axis 7. The planetary gears 3 have an external toothing system 3.0. The external toothing system 3.0 of the planetary gears 3 is in engagement in each case with the internal toothing system 1.0 of the internal gear 1.

The planetary carrier 2 is arranged on an operator's side 91 of the gear mechanism arrangement 10. Here, a cover plate 4 is arranged on a drive side 92 which lies opposite the operator's side 91. The cover plate 4 makes modular handling of the gear mechanism arrangement 10, its intermediate storage and its transport possible.

In an assembled adjusting drive (not shown), a drive with a drive motor (not shown), in particular a DC or EC electric motor, is arranged on the drive side 92, and also a sun gear (not shown) which can be driven by way of the drive and is provided for driving the planetary gears 3. The sun gear is guided through a recess (not shown) in the cover plate 4 between the planetary gears 3. It has an external toothing system (not shown) which is then in engagement with the external toothing systems 3.0 of the planetary gears 3.

During driving of the sun gear, in each case the external toothing systems 3.0 of the planetary gears 3 mesh with the external toothing system of the sun gear, with the result that the planetary gears 3 roll on the internal toothing system 1.0 of the internal gear 1. Since the planetary gears 3 are mounted rotatably on the planetary carrier 2, the planetary carrier 2 is rotated about the rotational axis 7 in the process.

A lubricant carrier 6 is pressed into the holder 2.1. FIG. 2(*a*) shows the gear mechanism arrangement in a delivery state A, and FIG. 2(*b*) shows it in an assembly state M.

In the delivery state A, no component 5 has yet been mounted on the planetary carrier 2. The lubricant carrier 6 is arranged in the holder 2.1 in such a way that the component 5 comes into contact with the lubricant carrier 6 when pushed in in the axial direction 71 and displaces said lubricant carrier 6 with it. In the exemplary embodiment which is shown, the lubricant carrier 6 is arranged in the holder 2.1 flush with a side 2.2 of the planetary carrier 2 which faces the component. As a result, the lubricant carrier 6 is visible and accessible from the outside. It can therefore also be impregnated with lubricant immediately before the component 5 is pushed into the holder 2.1.

In the assembly state M, the component 5 is arranged in the holder 2.1 on the operator's side 91. It bears against the lubricant carrier 6 in the assembly state M. For this purpose, the component 5 has a bearing journal 5.1. The bearing journal 5.1 is configured so as to correspond to the holder 2.1, with the result that it can be pushed into the holder 2.1, in particular with a clearance fit. It is then mounted rotatably in the holder 2.1.

The component 5 is preferably a hinge, in particular of a tailgate (not shown). The hinge comprises a lever (not shown) which is arranged in a rotationally fixed manner on the planetary carrier 2 on the side 2.2 which faces the component and rotates with the said planetary carrier 2 during driving of the planetary carrier 2. Here, the bearing journal 5.1 is stationary, with the result that the holder 2.1 then rotates about the bearing journal 5.1.

Since the lubricant carrier 6 is pressed into the holder 2.1, it discharges lubricant to the bearing point 50 when displaced in the axial direction 71. The component 5, in particular the bearing journal 5.1 of the component 5, is therefore already lubricated by way of the lubricant which is stored in the lubricant carrier 6 when pushed into the holder 2.1. In the case of an oil-impregnated planetary carrier 2, this lubrication takes place in addition to the conventionally provided lubrication. In addition, the pressure on the lubricant carrier 6 caused by being pressed in is maintained during displacement within the holder 2.1, with the result that the lubricant carrier 6 still discharges lubricant to the bearing point 50 even afterward.

As a result of the improved lubrication during operation of the gear mechanism arrangement 10, the bearing point 50 has lower wear and a longer service life and causes less noise.

What is claimed is:

1. A gear mechanism component (2) comprising
a holder (2.1) configured to be a bearing point (50) for mounting a second component (5), and
a lubricant carrier (6) which is infused with a lubricant and which is pressed into the holder (2.1),
wherein the gear mechanism component (2) is a planetary carrier (2) of a planetary gear mechanism arrangement (10), and wherein the gear mechanism component (2) has a side (2.2) which faces the second component (5) when the second component (5) is mounted in the gear mechanism component (2), and wherein the lubricant carrier (6) is arranged in the holder (2.1) on the side (2.2) which faces the second component (5) when the second component (5) is mounted in the gear mechanism component (2) such that the lubricant carrier (6) is displaced when the second component (5) is pushed into the gear mechanism component (2).

2. The gear mechanism component (2) according to claim 1, wherein when the lubricant carrier (6) is arranged in the holder (2.1) on the side (2.2) which faces the second component (5) when the second component (5) is mounted in the gear mechanism component (2), the lubricant carrier (6) is arranged in a delivery state (A).

3. The gear mechanism component (2) according to claim 2, characterized in that, when in the delivery state (A), the lubricant carrier (6) is arranged in the holder (2.1) flush with the side (2.2) which faces the second component.

4. The gear mechanism component (2) according to claim 1, characterized in that the lubricant carrier (6) is a felt or a sponge.

5. The gear mechanism component (2) according to claim 1, characterized in that the gear mechanism component (2) is sintered and oil-impregnated.

6. The gear mechanism component (2) according to claim 1, characterized in that the holder (2.1) is a bore.

7. A planetary gear mechanism arrangement (10) in an assembled state (M), the planetary gear mechanism arrangement (10) comprising a planetary carrier (2) and a second component (5), the planetary carrier (2) including a holder (2.1) in which the second component (5) is mounted, and the planetary carrier (2) including a lubricant carrier (6) which is infused with a lubricant and which is pressed into the holder (2.1), wherein the planetary carrier (2) has a side (2.2) facing the second component (5), wherein the lubricant carrier (6) is arranged, when in a delivery state (A), in the holder (2.1) on the side (2.2) facing the second component (5) such that the lubricant carrier (6) is displaced when the second component (5) is pushed into the planetary carrier (2).

8. The planetary gear mechanism arrangement (10) according to claim 7, characterized in that the second component (5) has a bearing journal (5.1) which is configured to be pushed into the holder (2.1) in an axial direction (71).

9. The planetary gear mechanism arrangement (10) according to claim 8, characterized in that the lubricant carrier (6) is arranged behind the bearing journal (5.1) in an axial direction (71).

10. The planetary gear mechanism arrangement (10) according to claim 8, characterized in that, when in the delivery state (A), the lubricant carrier (6) is arranged on the side (2.2) of the planetary carrier (2) facing the second component (5) in such a way that the bearing journal (5.1) comes into contact with the lubricant carrier (6) when pushed into the holder (2.1).

11. The planetary gear mechanism arrangement (10) according to claim 8, characterized in that the bearing journal (5.1) is mounted in the holder (2.1) and bears against the lubricant carrier (6).

12. The planetary gear mechanism arrangement (10) according to claim 7, characterized in that, when in the delivery state (A), the lubricant carrier (6) is arranged on the side (2.2) of the planetary carrier (2) which faces the second component (5) in such a way that the second component (5) comes into contact with the lubricant carrier (6) when pushed into the holder (2.1).

13. The planetary gear mechanism arrangement (10) according to claim 7, wherein the second component (5) bears against the lubricant carrier (6).

14. A tailgate drive having the planetary gear mechanism arrangement (10) according to claim 7.

15. A method for assembling the planetary gear mechanism arrangement (10) according to claim 7, having the following steps:
   pressing the lubricant carrier (6) into the holder (2.1) in or counter to an axial direction (71), with the result that the said lubricant carrier (6) is arranged on the side (2.2) of the planetary carrier (2) which faces the second component (5), and
   pushing the second component (5) into the holder (2.1) in the axial direction (71), the second component (5) displacing the lubricant carrier (6) in the axial direction (71).

16. The planetary gear mechanism arrangement (10) according to claim 7, characterized in that the holder (2.1) is a bore.

\* \* \* \* \*